A. WELIN.

APPARATUS FOR RAISING OR LOWERING SHIPS' BOATS.

APPLICATION FILED DEC. 2, 1907.

Reissued June 22, 1909.

12,980.

2 SHEETS—SHEET 1.

WITNESSES

Julius Schmidt

Edwin Cruse.

INVENTOR:

Axel Welin,

BY

R. H. E. Starr,

ATTORNEY.

A. WELIN.

APPARATUS FOR RAISING OR LOWERING SHIPS' BOATS.

APPLICATION FILED DEC. 2, 1907.

Reissued June 22, 1909.

12,980.

2 SHEETS—SHEET 2.

WITNESSES

Julius A. Mutz

Edwin Cruce

INVENTOR:

Axel Welin,

BY

R. H. E. Starr,

ATTORNEY.

UNITED STATES PATENT OFFICE.

AXEL WELIN, OF LONDON, ENGLAND, ASSIGNOR TO WELIN QUADRANT DAVIT, A CORPORATION OF NEW YORK.

APPARATUS FOR RAISING OR LOWERING SHIPS' BOATS.

No. 12,980. Specification of Reissued Letters Patent. Reissued June 22, 1909.

Original No. 711,749, dated October 21, 1902, Serial No. 74,412. Application for reissue filed December 2, 1907. Serial No. 404,865.

*To all whom it may concern:*

Be it known that I, AXEL WELIN, a subject of the King of Sweden, residing at Gerford street, in the city of London, England, have invented certain new and useful Improvements in Apparatus for Raising or Lowering Ships' Boats, of which the following is a specification.

This invention relates to davits which are so constructed that the davits themselves can turn downward, as in the constructions when the lower end of the davit is pivoted to the deck or when the lower end is in the form of a toothed quadrant which rolls on a rack.

Heretofore when the davit is lowered the boat is lowered at the same time, and thus a greater amount of power is required to hoist the boat inboard than is required to lower it out.

The object of this invention is to some extent equalize the amount of power that is required to launch a boat and that required to hoist it inboard.

According to this invention the tackle is so arranged that as the davit is lowered the boat is raised relatively to the upper end of the davit, and vice versa.

The drawings illustrate different arrangements made in accordance with this invention.

Figure 1:
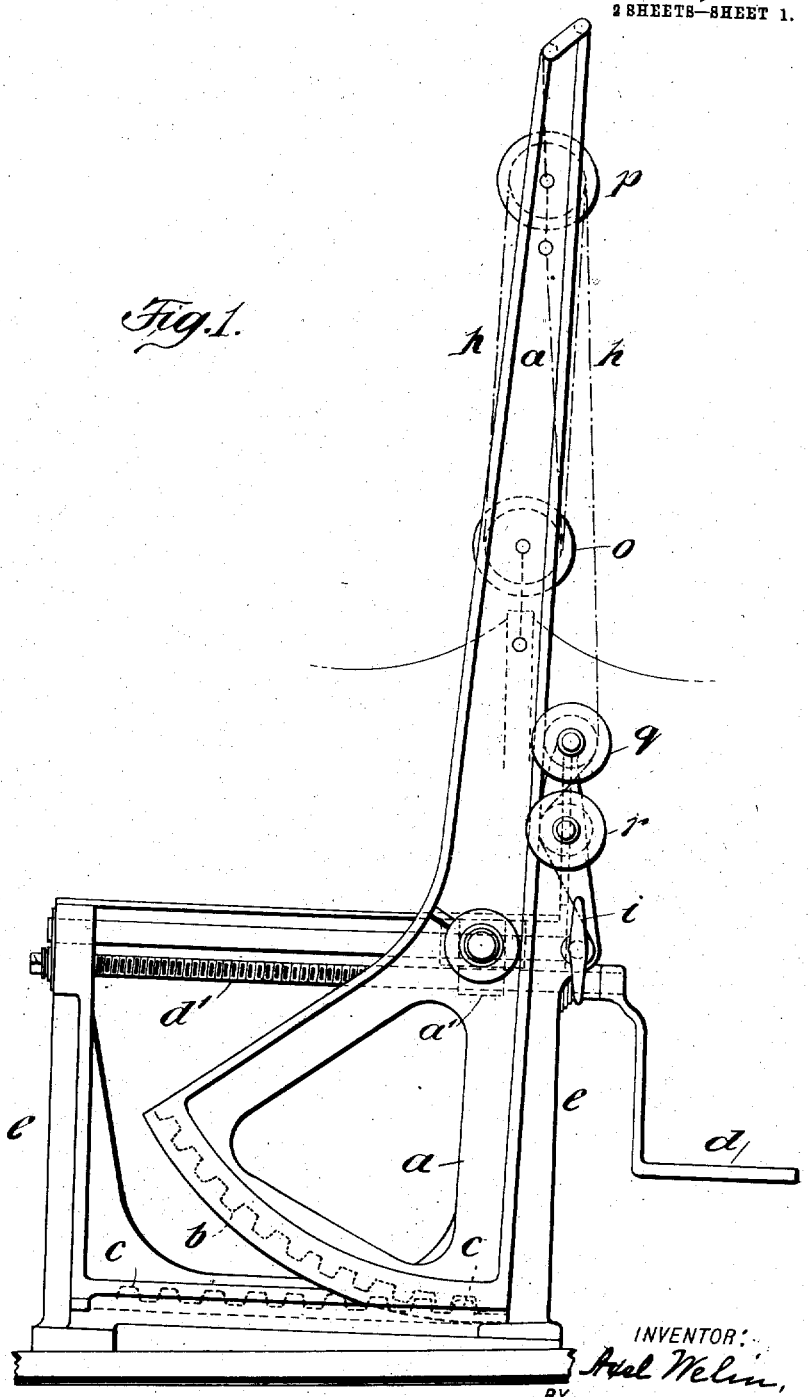
Figure 2:
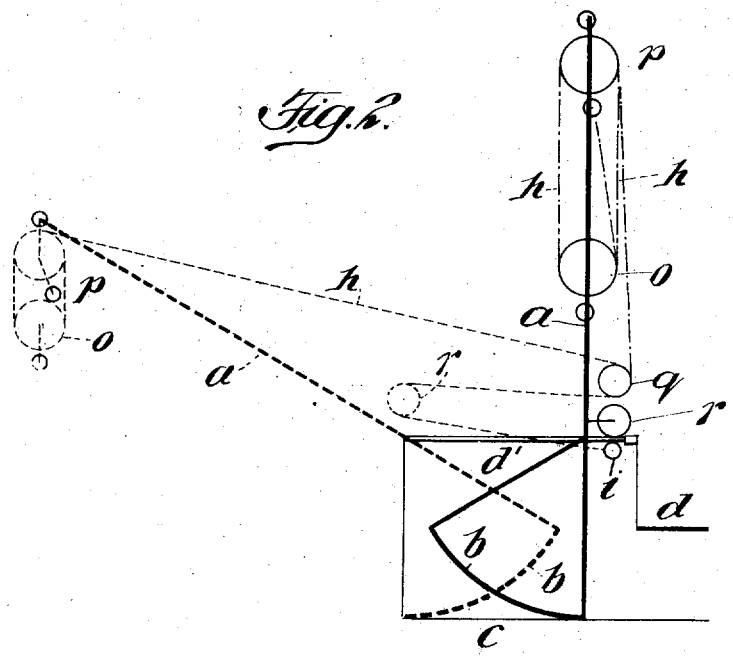
Figure 3:
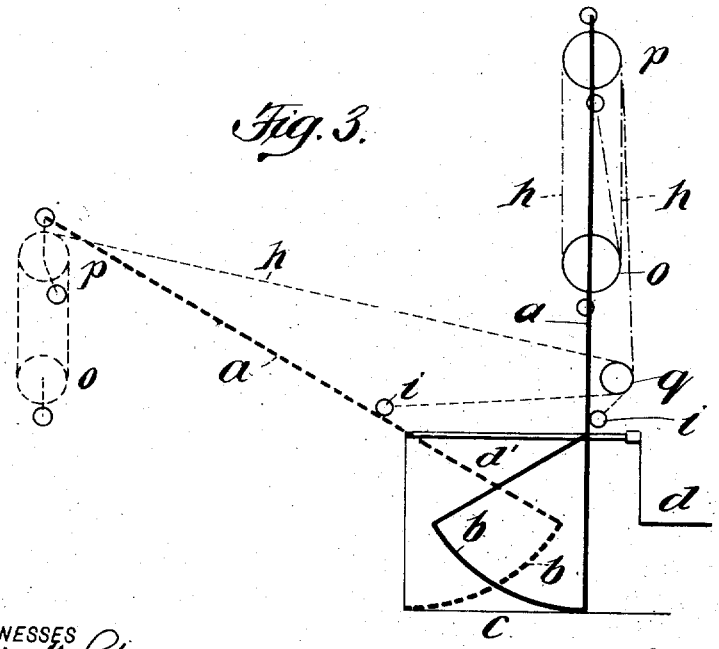

Figure 1 is a side elevation of a davit whose lower end is in the form of a toothed quadrant which rolls on a rack. Fig. 2 is a diagrammatic view of the same, showing the davit in two positions. Fig. 3 is a diagrammatic view showing a modification in which the pin to which the end of the rope is secured is mounted on the davit.

*a* is the davit, having a toothed quadrant *b* in its lower end which rolls on a rack *c*.

*d* is the handle for actuating the worm *d'*, carried by the bracket *e* and turning in the nut *a'*, pivoted to the davit.

The boat is attached to the lower pulley *o*, the upper pulley *p* being secured to the top of the davit. The rope *h* is secured to the pulley *p* and passes around the pulley *o* to the pulley *p*, back to the pulley *o*, then to the pulley *p*, then over the pulley *q*, fixed to the vessel, then over a pulley *r*, carried by the davit, and is finally secured to a pin *i* on the bracket *e*. Thus when the davit is turned outward the pulley *r* is moved away from the pin *i* and the pulley *q*, and so raises the boat relatively to the end of the davit.

In some cases the pulley *r* may be dispensed with the end of the rope being secured to a pin on the davit. This is illustrated in Fig. 3 where it will be seen that the rope *h* passes from the pulley *p* over the pulley *q* and is then secured to a pin *i*, carried by the davit, the dotted line showing the outboard position of the davit, in which position it will be seen, the pin *i* draws the rope around the pulley *q* as the davit moves outboard.

In all the arrangements a suitable position for the pin *i* is at a distance of about one-third of the length of the davit from the deck and above the center of rotation around which the davit turns whether the pin is on the ship or on the davit.

What I claim is:—

1. The combination of a davit free to turn in a vertical plane, a pulley carried by its upper end, an attachment for carrying a boat, a rope passing over the pulley and supporting the attachment, a pulley fixed to the vessel around which the rope passes, and means carried by the davit for drawing the rope over the pulleys as the davit moves outboard.

2. The combination of a davit free to turn in a vertical plane, a pulley carried by its upper end, another pulley to which the boat is attached, a rope passing around both of said pulleys, another pulley fixed to the vessel around which the rope passes, and means carried by the davit for drawing the rope over the pulleys as the davit moves outboard.

3. The combination of a davit free to turn in a vertical plane, a pulley carried by its upper end, an attachment for carrying the boat, a rope passing over said pulley and supporting the attachment, a pulley fixed to the vessel around which the rope passes, another pulley fixed to the davit, and a pin to which the end of the rope is secured.

4. The combination of a davit free to turn in a vertical plane, a pulley carried by its upper end, another pulley to which the boat is attached, a rope passing around both pulleys, another pulley fixed to the vessel around which the rope passes, another pulley fixed to the davit, and a pin in the vessel to which the rope is secured.

5. The combination of a davit, free to turn in a vertical plane and also having a horizontal movement, a pulley carried by its upper end, an attachment for carrying a boat, a rope passing over the pulley and supporting the attachment, a pulley fixed to the vessel around which the rope passes and a securing device to which the free end of the rope is attached—the said devices being arranged to cause the outboard movement of the davit to draw the rope over the pulleys to raise the boat.

6. In a device for raising and lowering boats, the combination with a boat, of a davit having horizontal and swinging movement, means for connecting the same, and operating means for operating the same—the aforesaid elements being constructed and arranged to cause a simultaneous horizontal and swinging movement of the davit proper, and a simultaneous raising of the boat nearer to the outer end of said davit immediately upon the operating mechanism being set in motion.

In testimony whereof, I have hereunto set my hand in the presence of two subscribing witnesses.

AXEL WELIN.

Witnesses:
GEORGE H. SCHRODER,
JOS. F. O'BRIEN.